3,745,116
ANTISTATIC POLYMER COMPOSITION OF POLY-
HYDRIC ALCOHOL AND ALKALI METAL
CARBOXYLATE
Gordon D. Brindell, Crystal Lake, Ill., and Leland E.
Dannals, Waterbury, Conn., assignors to Uniroyal, Inc.
No Drawing. Original application Oct. 17, 1969, Ser. No.
867,410, now Patent No. 3,658,744. Divided and this
application Mar. 15, 1972, Ser. No. 235,028
Int. Cl. C09k 3/16
U.S. Cl. 252—1          5 Claims

ABSTRACT OF THE DISCLOSURE

Polymer compositions are provided which are sufficiently electrically conductive so as to inhibit the build-up of electrostatic charges. The compositions contain an effective amount of an antistatic agent selected from the group consisting of alkali metal salts of organic acids or mixtures thereof with or without at least one polyhydric alcohol.

This is a division of application Ser. No. 867,410, filed Oct. 17, 1969, now U.S. Pat. No. 3,658,744.

This invention relates to new polymer compositions having electrically conductive properties such that the compositions are capable of inhibiting the build-up of electrostatic charges. This invention also relates to articles made from the coated with said compositions.

The invention has particular application in the manufacture of carpets, the face of which is made from fibrous textile material which is use normally tends to accumulate a charge of static electricity, the charge being dissipated by the use of the polymer as a carpet backing. In addition, the invention provides methods of using such polymers and articles treated with such polymer compositions.

BACKGROUND OF THE INVENTION

The build-up of charges of static electricity by friction on the surface of an article of manufacture or during the process of manufacture of such articles is a well known phenomenon. Elastomeric and plastic materials generally exhibit a considerable tendency to accumulate static electricity upon milling, calendering, extruding or other operations of manufacture. At times, the static electricity build-up may lead to sudden discharge in the form of sparks or flashes; at other times personnel handling such equipment of manufacture may be exposed to electrical shock.

Furthermore, the presence of a static electrical charge on an article during manufacture causes dust particles to adhere, which results in a coarse surface which requires additional costly polishing operation.

The build-up of static electricity also affects finished articles of which housings of vacuum cleaners are one example. The accumulation of static charges on carpet is well known by anyone who has walked on a carpet when the humidity is low.

Several approaches to overcome the build-up of static electrical charges have been proposed, and numerous antistatic agents are commercially available, such as alph-N-dodecanol-omega-hydroxypoly(oxyethylene), N,N - bis(2-hydroxyethyl)alkylamines, N,N - bis(2-hydroxyethyl)dodecanamide, phosphate esters of the condensation products of nonyl phenol and ethylene oxide, n-alkylsulfonates, N-alkyl sarcosines, methyldodecylbenzyltrimethylammonium chloride, glycerolmonostearate, mono- and diglycerides, lactylated mono- and diglycerides, glycols, polyols. In general, fatty alcohols and quaternary ammonium salts seem to dominate the field.

Some of the foregoing antistatic agents are applied to the surface of a finished article or during manufacture of an article. However, such surface treatment usually provides only temporary effectiveness. Other antistatic materials may be compounded directly into the polymeric substrate, but, in many cases, the original physical-mechanical properties of a polymer are detrimentally affected.

Another method proposed to defeat the problem of static electricity has been the incorporation of metallic, e.g. stainless steel, fibers into a polymeric material. However, even this approach has not been satisfactory in comparison to the antistatic agents of the instant invention.

Another consideration as to the feasibility of an antistat is its cost. The antistatic agents of the instant invention are particularly effective and inexpensive.

U.S. Pat. No. 2,717,842 in the name of Vitalis is directed to antistatic treatment of textile materials in fiber, fabric or other form by applying a liquid treating composition (specifically an aqueous solution or dispersion) comprising (1) an antistatic agent which is a soluble inorganic salt that normally is deposited in the form of relatively large crystals upon volatilization of the solvent in which it is dissolved, and (2) a crystal growth-inhibiting agent in an amount, with respect to the said antistatic agent, that is sufficient to inhibit the deposition of such crystals. However, this patent does not suggest the present invention but is limited to the use of inorganic salts in conjunction with crystal growth-inhibiting agents. In contrast, the antistatic salt used in the present invention contains an organic anion derived from carboxylic acids containing 1 to 20 carbon atoms and, more preferably, 1 to 4 carbon atoms, such as formic acid, acetic acid, propionic acid or butyric acid. It will be demonstrated that the alkali metal salts of these anions, when employed in the invention, are superior to other anions, whether organic or inorganic, including many mentioned by Vitalis. Moreover, the present invention discloses the addition of the antistatic agents of the invention to a rubber or plastic in its solid or liquid phase or to the aqueous phase of a polymer latex. These polymers can be the same type as those which have been used for many years in the manufacture of articles, such as rubber soles, plastic housings, or in carpets as a means of securing the tufts of the textile fibrous material which form the carpet face to the primary jute backing, or to form a coating on the lower face of a carpet made by simple mechanical tufting.

British Pat. No. 1,018,349 (Farbenfabriken Bayer) teaches the use of polypropylene glycols (PPG) as antistatic agents in acrylonitrile-butadiene-styrene thermoplastics (ABS), the PPG having an average molecular weight range from about 2000 to 5000. While the foregoing agents are known to provide antistatic effects, we have demonstrated that the alkali metal carboxylates alone or in conjunction with polyols induce unexpected and superior antistatic properties to polymer compositions.

In the copending application of William Earl Wells, Ser. No. 729,441, filed May 15, 1968, lithium chloride is disclosed as an antistat in carpet technology. It does not militate as prior art with respect to this invention since it, in no way, suggests that alkali metal carboxylates alone or in combination with polyhydric alcohols, such as glycerine or polyethylene glycols may be employed as an antistat in carpets. Moreover, while lithium chloride provides adequate antistat properties, there are certain disadvantages to its use: (1) carpets made with it tend to pick up an excessive amount of moisture when exposed to high relative humidity; (2) LiCl tends to promote the resinification of the polymer leading to brittleness, and (3) the cost of the chemical is high relative to those of the instant invention.

OBJECTS OF THE INVENTION

It is thus the object of the invention to provide improved polymer compositions which are sufficiently electrically conductive so as to inhibit the build-up of static electricity thereon or on a surface to which the compositions are applied.

Another object of the invention is to provide articles of manufacture produced from such improved polymer compositions.

Another object is to provide articles of manufacture made of a material which in use tend to accumulate electrostatic charges, said articles having contactably associated therewith a rubber, a plastic or a rubber latex composition containing a chemical which confers antistatic properties to said article.

A still further object is to provide a composite article of manufacture comprising a fibrous textile material which in use normally tends to accumulate a charge of static electricity, the fibrous material having attached thereto a dried deposit of rubber latex containing a chemical which confers antistatic properties to the article.

The invention also provides a carpet characterized by a backing composition which allows for the dissipation of static electricity built-up in the carpet.

As a further object, the invention also provides a method for treating articles which tend to accumulate charges of static electricity and reduce their tendency to buildup such charges.

These and other objects will more clearly appear from the following disclosure which illustrates effective composition ranges for rubber latex containing alkali metal carboxylates and a polyol.

GENERAL STATEMENT OF THE INVENTION

Stating it broadly, we provide improved polymer compositions which are sufficiently electrically conductive so as to inhibit the build-up of a charge of static electricity themselves per se or on material on which the compositions are deposited. These compositions containing an effective amount of at least one alkali metal carboxylate as antistatic agent such as those selected from the group consisting of alkali metal organic salts of formic acid, acetic acid, propionic acid and butyric acid, that is to say, alkali metal formate, acetate, propionate and butyrate.

We find it advantageous in achieving optimum results that the aforementioned alkali metal organic salt be used together with a polyhydric alcohol.

The antistatic agents of the invention may be directly added to rubbers or plastics in the so-called dry state or they may be dissolved in solution or the aqueous phase of a rubber latex composition. The rubber latex composition containing the dissolved antistatic agents can be used in the manufacture of carpets in the conventional way.

It is possible to achieve the advantages of our invention by employing antistatic agents as additives to polymer compositions applied to the back of carpet made by simple mechanical tufting. However, better results are achieved when the latex composition is used not only as the tufting adhesive but, in addition, is applied in the form of a coating over the entire back of the carpet, with or without a secondary jute backing, since this double use of latex containing our antistat composition provides a better electrical path than the single use.

If desired, further protection against the build-up of a static electrical charge in the carpet can be achieved by providing means to conduct the static electricity to the ground. This may take the form of one or more metallic conductors leading from the bottom of the carpet to a ground or grounds. Such additional protection is especially advantageous in installations in hospitals, etc. where sparks create a fire or explosion hazard. In this connection, the novel polymer compositions of the invention may have use in providing electrically conductive surgical shoe soles for use in operating rooms where sparks must be avoided. Such shoes may, in effect, be cover-alls for regular shoes and made of fabric or cellulosic material having a tendency to build up electrostatic charges in frictional contact with the floor.

In practicing our invention, we can use any conventional polymer composition. Thus, it may be natural rubber or synthetic rubber such as polyisoprenes, polybutadienes, butadiene-styrene copolymers which typically contain from 40 to 95% by weight of combined butadiene and correspondingly from 60 to 5% of combined styrene, butadiene-acrylonitrile copolymers, polychloroprene, polyisobutylene, ethylene-propylene copolymers or ethylene-propylene-diene terpolymers, poly-alpha-olefin rubbers, and also plastics, such as polyethylenes, polypropylenes, polystyrene, polyacrylates, styrene-acrylonitrile copolymers, polyacetates, polyethers, phenolformaldehyde copolymers, polyesters, polyvinylchloride, polyamides, polysulfones, acrylonitrile-butadiene-styrene polymers, cellulose or blends of two or more of the above polymers.

These polymers may be in their dry, solution or emulsion (i.e. latex) phase, and they may be of the carboxylated or non-carboxylated type.

The above-mentioned polymers may also be used for foam, sponge or blown and cellular materials.

The polymers are compounded in accordance with techniques well known in the art. Thus, they may be compounded with accelerators, vulcanizing agents, particularly sulfur, ammonium zirconyl carbonate, zinc oxide, fillers, such as calcium carbonate, clay, starch, extender oil or other filler material.

Any material which normally tends to build up a charge (whether positive or negative) of static electricity as a result of friction on its surface for instance as a result of walking (in the case of carpet), can be successfully treated in accordance with our invention. Examples of fibers which give trouble with static build-up are those made from wool, polypropylene, nylon, polyacrylonitrile. The invention is particularly applicable with synthetic or man-made fibers, but can be applied to natural fibers such as wool which is often used in carpets. The invention is applicable to viscose rayon, acetate rayon and other man-made fibers derived from cellulose.

Use of our antistatic agents in a polymer latex carpet-backing composition for static reduction lends itself particularly to use in the case where conductive metal fibers, such as very fine stainless steel fibers of known type, are spun in known manner with the fibrous textile material in the manufacture of the yarns from which the carpet face is made. By the use of our antistatic agents in latex carpet-backing compositions in conjunction with such conductive metallic fibers in the tufts which constitute the face of the carpet, it is possible to use a greatly reduced proportion of such metal fiber with a correspondingly great reduction in cost of the carpet.

If such synthetic fibers are made from the improved polymer compositions of the instant invention, their tendency to build up an electrical charge will be reduced, thus possibly eliminating the necessity of incorporating metallic fibers.

The amount of alkali metal salt of a carboxylic acid and the amount of polyol or polyether glycol relative to each other and to the polymer or composition solids should be sufficient to achieve the desired antistatic effect in the final product while keeping the costs low and maintaining physical and mechanical properties for good service under a wide range of relative humidity. By physical and mechanical properties is meant such inherent properties as glass transition temperature, crystalline melting point, decomposition temperature, tensile strength, modulus, elongation, hardness, abrasion and tear resistance, adhesive strength, melt, Brookfield, intrinsic and Mooney viscosities, ozone and flame resistance, oil and chemical resistance, solubility, cure rate, compounding ease, etc.

The antistatic agents of the instant invention seem to have only minor effect on the above properties at the desired level of application.

The amounts of alkali metal carboxylate and of polyol, that may be employed here, are best expressed in milligram equivalent units since the antistatic performance of of these materials is related to, but not a function only of, the number of ions and the number of hydroxy groups in the various polymer compositions. Milligram equivalent(s) is abbreviated for convenience as meq. and is used hereinafter as defining the formula weight in milligrams, or, in the case of mixtures the average formula weight in milligrams divided by the functionality. This functionality, in the case of alkali metal carboxylates, is the number of alkali metal ions associated with one molecule of the carboxylate ion, while for polyols, it is the number of hydroxy groups in one molecule. For any particular compound, the number of milliequivalents or number of meq.'s, stands for a definite weight of that compound. This definite weight, number of meq.'s is based either on 100 g. of the polymer solids present in the polymer composition, or on 100 g. of the polymer composition solids. Polymer solids is used here to include not only polymer, but also those non-polymeric residual materials that are used in the manufacture of the polymer. Polymer composition solids, or composition solids, include the polymer solids plus any modifying and/or extending materials such as fillers, oil, carbon black and the like. As will be appreciated, composition solids may comprise polymer alone or polymer plus the aforementioned modifying or extending materials.

The alkali metal carboxylates may be added to the polymer compositions to achieve concentrations of from 1 to 250 meq. per 100 g., preferably 5 to 100 meq. per 100 g. of composition solids.

As has been stated hereinabove, it is preferred to employ polyols in using our antistatic agents in the polymer compositions. The amount of polyol employed may vary from about 0.3 to 450 meq. per 100 g. of composition solids. Preferably, a range of 3 to 300 meq. per 100 g. composition solids may be employed.

The ratio of meq. of alkali metal carboxylates per 100 g. composition solids to meq. of polyols per 100 g. composition solids may range from 50:1 to 1:100 but the preferred range of this ratio is 30:1 to 1:30.

Many alkali metal carboxylates are suitable for the preparation of antistatic polymer compositions. They may be represented by the general formula

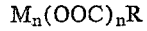

$$M_n(OOC)_nR$$

where M stands for alkali metal such as lithium, sodium and potassium; wherein $n$ is an integer ranging from 1 to 4; where R is either hydrogen or a mono-, di- or polyradical group such as alkyl, cycloalkyl, alkenyl, aryl, aralkyl or alkylaryl having from 1 to 20 carbon atoms, R may also carry one or more substituent groups such as —X, —OR', —SR' or —CN where X designates a halide selected from the group consisting of fluorine, chlorine, bromine and iodine; where O, S, C, stand for oxygen, sulfur and carbon respectively; and where R' represents a hydrocarbon radical, or from 1 to 7 carbon atoms similar to the above-described R. However, the total carbon atoms of R and R' should not exceed 20.

Examples for compounds as indicated by the foregoing general formula are potassium formate, lithium acetate, potassium propionate, potassium butyrate, potassium valerate, potassium octanoate, sodium laurate, potassium pentadecanoate, potassium stearate, lithium arachidate; also potassium oxalate, lithium malonate, potassium succinate, sodium adipate, potassium brassylate, potassium pentane - 1,1,5 - tricarboxylate, sodium 2-propylpentane-1,2,4-tricarboxylate, potassium 3-hexene-2,2,3,4-tetracarboxylate, also lithium vinylacetate, potassium allylacetate, lithium acrylate, sodium crotonate, also potassium maleate, sodium fumarate, lithium glutaconate, also potassium cyclohexyl formate, lithium benzoate, sodium phenylacetate, potassium naphthylacetate, potassium phthalate and the like. In addition to the foregoing alkali metal salts, it will be appreciated that the salts of rubidium, cesium and francium may also be employed.

Examples for substituted alkali metal carboxylates are potassium monochloroacetate, potassium trichloroacetate, lithium glycolate, potassium cyanoacetate, potassium tartrate, potassium citrate, potassium acetoacetate, potassium diglycolate, potassium thioglycolate, potassium anisate, sodium mandelate and others.

Under polyols are understood hydrocarbon compounds having more than one hydroxy group. Particularly suitable are polyols selected from the group consisting of sorbitol, ethylene glycol, propylene glycol, tetramethylene glycol, glycerine, pentaerythritol, and polyether glycols such as poly(ethylene glycol) poly(propylene glycol). The molecular weight of these polyols may range from 62 (ethylene glycol) to about 500 for polypropylene glycol and, advantageously, from about 92 to 4000.

The preferred alkali metal carboxylates are those of potassium formate, acetate, propionate and butyrate especially when used in latex polymer compositions.

The additive alkali metal carboxylate may be provided in the form of a solution or dispersion in polyol, e.g. glycerol, which is then compounded into the polymer, the carboxylate salt being derived from carboxylic acids containing 1 to 20 carbon atoms and, more preferably, from those acids containing 1 to 4 carbon atoms.

DETAILS OF THE INVENTION

The method of producing molded, cast or extruded articles is well known. Because the invention is particularly applicable to the manufacture of carpets, and because the manufacture of carpets is rather intricate and involves many variables, a detail description will be given insofar as it relates to carpets.

In the manufacture of a tufted carpet, the face yarn is pushed into the primary jute backing and held there by frictional forces. A latex compound is then applied to the back of the primary jute backing with the effect that, upon driving off the water by drying, the tufts are firmly bonded to the jute and the carpet has some dimensional stability. Usually a secondary backing, e.g. another layer of jute with a layer of latex, is applied for improved appearance.

The antistatic compositions of the instant invention are especially suitable not only as a primary (i.e. adhesive) and "secondary backing but also as a "scrimming" adhesive to bond to tufted primary backing to the secondary backing. The use of said antistatic agents in all three abovementioned layers is especially effective because it provides a continuous electrical path from each tuft to the entire floor-engaging face of the carpet.

Several tests are ordinarily performed in order to determine performance and quality of carpets. It has been found that the measurement of the force required to remove the secondary backing is a satisfactory method of determining the effectiveness of the latex compound. This test is called ultimate adhesion. The unit of measure is pounds per 3 inch wide strip.

The moisture pick-up of a carpet is determined on samples without secondary backing. The weight gain after exposure to 80–85% relative humidity (72° F.) is related to the dry weight by a percent figure.

The measurement of the antistatic properties of a carpet usually takes the form of a simulated use test. For instance, the voltage developed by a person walking on a carpet is measured. However, in the present work, back surface resistivity is measured, since the conductivity of the coating compound is of principal concern, and since it has been found that the correlation between this measurement and simulated use tests is very good. A surface resistance of 100 gigohms (1 gigohm=$10^9$ ohms) or less is desirable for a conventional carpet.

It may be pointed out that in other articles of manufacture, the general degree of resistivity may vary according to requirements and/or specifications.

As illustrative of polymer compositions that may be compounded according to the invention, for each 100 parts by weight (e.g. grams) of polymer solids, up to about 2500 parts by weight (e.g. grams) of extenders may be employed, e.g. 100 to 1500 parts by weight of extenders. Other ingredients, such as stabilizers, antifoam agents, bactericides, etc. may be added, and enough water to give a total of about 68% solids by weight. Thickeners, usually polyacrylates, are added to establish a viscosity of about 200 to 10,000 cps. The amount of alkali metal carboxylate added is detremined on the dry basis of the total solids present. Thus, as stated hereinbefore, for 100 parts by weight (grams) of composition solids present, the amount of alkali metal carboxylate may range from about 1 to 250 meq. and, more preferably, from about 5 to 100 meq. On the basis of 100 g. composition solids, the polyol if present may range from 0.3 to 450 meg., but preferably 3 to 300 meq.

The efficacy of our antistatic agents will be demonstrated with polymer compositions supported on glass. The polymer compositions used here contained 25% polymer solids relative to the composition solids with remaining solid materials consisting of principally calcium carbonate filler with small amounts of tetrapotassium pyrophosphate and acrylate thickeners. These polymer compositions, as liquids, were cast as films on glass plates and dried overnight at room temperature. The films on the glass plates were then oven dried and placed in a glove box at 17% relative humidity and 72° F. After allowing a few days to reach moisture equilibrium, the surface electrical resistance of these films was measured and expressed as megohms per square, that is 10⁶ ohms/square. Antistatic performance is, of course, improved as the surface resistance becomes smaller. Film strength, adhesion and other attributes were not measured during these tests, but anyone skilled in the art and knowledgeable as to his antistatic requirements and his substrates, would be able to use the results of the following Table 1 to fabricate a product of remarkable antistatic properties as well as the other require properties.

TABLE 1.—SURFACE ELECTRICAL RESISTANCE OF POLYMER COMPOSITIONS ON GLASS IMPROVEMENT EFFECTED BY THE PRESENCE OF ANTISTATIC AGENTS

| Potassium formate, meq./100 g. composition solids | Glycerine, meq./100 g. composition solids | Meq. ratio, potassium formate to glycerine | Surface electrical resistance, 17% relative humidity at 72° F. megohms/ square |
|---|---|---|---|
| 48 | 0 | | 4.2 |
| 42 | 16 | 1:0.4 | 5.0 |
| 36 | 33 | 1:0.9 | 1.7 |
| 24 | 65 | 1:2.7 | 2.1 |
| 12 | 98 | 1:8 | 2.1 |
| 6 | 114 | 1:19 | 12.5 |
| 0 | 130 | | 27.8 |
| 0 | 0 | | 25,000,000 |

The data of Table 1 show that extraordinary reduction of surface electrical resistance that is required to confer antistatic properties on an article is achieved by our antistatic agents, at from 6 to 48 meq., alkali metal carboxylate (potassium formate) and 0 to 114 meq., polyol (glycerine) per 100 g. composition solids. It is to be noted that the upper limit of the meq. ratio of alkali metal carboxylate to polyol (potassium formate to glycerine) is unlimited (1:0) while the lower limit of this ratio, 1:19 does not exceed, in the above table, the actual lower limit of utility.

The effectiveness of the antistatic agents of the instant invention in polymer compositions that have a low polymer content will be demonstrated. The experimental procdue was identical with that given for Table 1, but the percent polymer solids of the composition solids was reduced by increasinng the filler. The amounts of antistatic agents were kept constant in relation to the polymer solids so these amounts, in relation to the composition solids, were reduced. The meq. ratio of alkali metal carboxylate (postassium formate) to polyol (glycerine) was kept constant at 1:2.7. These data are in Table 2.

TABLE 2.—SURFACE ELECTRICAL RESISTANCE OF POLYMER COMPOSITIONS ON GLASS

| Percent filler in the polymer composition | Potassium formate, meq./100 g. of— | | Glycerine, meq./100 g. of— | | Surface electrical resistance, megohms/sq. |
|---|---|---|---|---|---|
| | Polymer solids | Composition solids | Polymer solids | Composition solids | |
| 0 | 95 | 95 | 261 | 261 | 0.4 |
| 75 | 95 | 24 | 261 | 65 | 2.1 |
| 83 | 95 | 16 | 261 | 43 | 13.2 |
| 88 | 95 | 11 | 261 | 31 | 9.2 |
| 91 | 95 | 9 | 261 | 24 | 5.5 |

The fact that antistatic agents of great utility have been discovered is strongly supported by the data of Table 2. It will be noted that small concentrations of the antistatic materials may be employed to keep the surface electrical resistance low. Good antistatic properties always attend a low surface electrical resistance of an article. Since the filler is the least expensive ingredient of the above polymer composition, lower cost articles having good antistatic properties can be made in accordance with the invention. We wish to point out, furthermore, that the Table 2 results show that the antistatic agents of the invention are effective from about 9 meq. or less to more than about 95 meq. alkali metal carboxylate (potassium formate) per 100 g. composition solids and on the same basis, from about 24 meq. or less to about 261 meq. or more polyol (glycerine).

As additional supporting evidence that the antistatic agents give outstanding results, tests were conducted with a polymer composition that contained only 9% polymer solids with increasing amounts of the agents. The experimental details are the same as given in Table 1. The results given in Table 3 show an astonishing decrease in surface electrical resistance as the amounts of antistatic agents are increased. In fact, the upper limit of effectiveness of these agents in this polymer composition is above 45 meq. potassium formate and 148 meq. glycerine per 100 g. of composition solids.

TABLE 3.—RANGE OF EFFECTIVENESS OF THE ANTISTATIC AGENTS IN POLYMER COMPOSITIONS CONTAINING 9% POLYMER SOLIDS ON GLASS

| Potassium formate, meq./100 g. composition solids | Glycerine, meq./100 g. composition solids | Surface electrical resistance, megohms/ square |
|---|---|---|
| 0 | 0 | (¹) |
| 1 | 3 | 17,000,000 |
| 9 | 24 | 5.5 |
| 27 | 74 | 1.0 |
| 45 | 148 | 0.1 |

¹ Reverse current.

It is seen, in the foregoing Table 3, that without antistatic agents, this polymer composition has such high surface electrical resistance that leakage in the system of capacitative discharge causes an apparent reverse current flow. It will be noted that the antistatic agents begin to show effectiveness at levels of 1 meq. potassium formate and 3 meq. glycerine per 100 g. composition solids.

Shelf life is an important consideration in polymer compositions containing antistats, particularly since such compositions may be stored for some time between manufacture and ultimate use. Antistatic agents which cause polymer instability are not commercially desirable.

A typical carpet coating composition illustrated hereinafter by way of example was compounded by employing the following order of steps:

Formulation (1) Synthetic polymer latex, 50% solids, 200 g. (100 g. solids) containing a carboxylated butadiene/styrene polymer of approximately 60% by weight of styrene. A mixture of anionic emulsifiers is used in the manufacture. The pH is 9 plus.

(2) A bactericide, "Dowicide G" emulsion (sodium pentachlorophenoxide), 25% solids, 1.0 g. (0.25 g. dry).

(3) Alkylated para-cresol emulsion, 49% solids, 2.1 g. (1.0 g. dry), an antioxidant known as "Wing Stay L."

(4) An aqueous solution of tetrapotassium pyrophosphate as stabilizer, 50% solids, 1.5 g. (0.75 g. dry).

(5) Aqueous solutions of the alkali metal carboxylate antistats (15% to 20%) in amounts as described in the examples. Polyols and polyether glycols were added without previous dilution.

(6) Water in an amount calculated to give 68% solids.

(7) Georgia #10, a powdery calcium carbonate filler or whiting, 300 g. It is added dry, in small increments, to the agitated mixture of ingredients 1 through 6.

(8) Sodium polyacrylate thickener, 10% solids, no more than 30 g. (3 g. dry) but enough to attain 7000–8000 c.p.s. viscosity (Brookfield viscometer #4 spindle at 10 r.p.m.).

As illustrative of the various embodiments of the invention, the following examples are given:

EXAMPLE 1

The carpet compound is prepared as described in Steps 1 to 8. The alkali metal carboxylates of Step 5 are identified by name and amount in Table 4 which is a summary of the various tests obtained on the resulting carpet utilizing the improved polymer composition containing 25% polymer solids by weight.

TABLE 4.—ANTISTATIC AGENTS VS. CARPET PROPERTIES

| Alkali metal carboxylate (65 meq. glycerine per 100 g. composition solids also used) | | Carpet back surface Electrical resistance, 15% relative humidity at 72° F., gigohms/sq. | Carpet ultimate adhesion, pounds/3 inches | Carpet, percent moisture pick-up at 80% relative humidity at 72° F. |
| --- | --- | --- | --- | --- |
| Name | Meq./100g. composition solids | | | |
| Potassium: | | | | |
| Formate | 21 | 3.3 | 10 | 5.3 |
| Acetate | 19 | 15.0 | 10 | 7.8 |
| Propionate | 17 | 15.0 | 9 | 5.9 |
| Control (no antistatic agent) | | 18,000 | 11 | 5.0 |

EXAMPLE II

This example illustrates the various results obtained with alkali metal cations as acetates as compared to the control composition, the surface electrical resistance with lithium acetate being only about ⅓ that of the control (note Table 5). The potassium salt is particularly advantageous as an antistat as evidenced by the very low value of 15.5 gigohms per square. It also should be noted that the ultimate adhesion of the carpet is not seriously affected by these antistatic agents, and the increase in moisture pick-up is very near to the minimum expected with reduced surface electrical resistance. These data show the reason for our stated preference for potassium as the alkali metal since it seems more effective to reduce surface electrical resistance. The coating composition contained 25% polymer solids by weight.

TABLE 5.—ANTISTATIC AGENTS VS. CARPET PROPERTIES

| Alkali metal carboxylate (all except control, contain 65 meq. glycerine per 100 g. composition solids) | | Carpet back surface electrical resistance, 15% relative humidity at 72° F., gigohms/sq. | Ultimate adhesion of carpet, pounds/3 inches | Carpet, percent moisture pick-up 80% relative humidity at 72° F. |
| --- | --- | --- | --- | --- |
| Acetate of— | Meq./100 g. composition solids | | | |
| Potassium | 20 | 15.5 | 10 | 7.8 |
| Sodium | 24 | 3,000 | 9 | 8.5 |
| Lithium | 30 | 6,700 | 9 | 8.6 |
| Control (no antistatic agent) | | 18,000 | 11 | 5.0 |

EXAMPLE III

To demonstrate that a great variety of carboxylates may be suitable for the reduction of static electricity in polymer compositions, a latex was prepared following the formulation outlined herebefore, and the antistatic agents were added in the usual manner at the levels indicated in Table 6. In all cases, potassium salts were selected. The coating composition contained 25% polymer solids by weight.

TABLE 6.—ANTISTATIC AGENTS VS. CARPET PROPERTIES

| Alkali metal carboxylate (all, except control, contain 65 meq. glycerine per 100 g. composition solids) | | Carpet black surface electrical resistance, 15% relative humidity at 72° F. gigohms/sq. | Carpet ultimate adhesion, pounds/ 3 inches | Carpet percent moisture pick-up, 80% relative humidity |
| --- | --- | --- | --- | --- |
| Potassium salt of— | Meq./100 g. composition solids | | | |
| Formate | 24 | 3.3 | 10 | 5.3 |
| Acetate | 10 | 15.5 | 10 | 7.8 |
| Propionate | 18 | 15.0 | 9 | 5.9 |
| Buyrate | 16 | 80 | 9 | 7.6 |
| Valerate | 14 | 260 | 9 | 7.2 |
| Octanoate | 11 | 8,380 | 9 | 6.6 |
| Lactate | 16 | 170 | 13 | 7.1 |
| Oxalate | 24 | 170 | 13 | 5.5 |
| Succinate | 21 | 250 | 10 | 7.6 |
| Tartrate | 18 | 3,300 | 15 | 6.8 |
| Citrate | 20 | 5,600 | 15 | 6.6 |
| Control | | 18,000 | 11 | 5.0 |

EXAMPLE IV

This example is presented to demonstrate the effectiveness of three polyols in combination with the antistatic agents of the invention. The data are presented in Table 7. It will be observed that the three polyols reduce the surface electrical resistance of carpet by a large amount when used with an alkali metal carboxylate (potassium acetate). As in the previous example, the coating composition contained 25% polymer solids by weight.

TABLE 7.—COMPONENTS OF INSTANT ANTISTATIC AGENTS VS. CARPET PROPERTIES

| Polyol (all, except control, contain 24 meq. potassium acetate per 100 g. composition solids) | | Carpet back surface electrical resistance, 15% relative humidity at 72° F. gigohms/ sq. | Carpet ultimate adhesion, pounds/ 3 inches | Carpet, percent moisture pick-up, 80% relative humidity at 72° F. |
|---|---|---|---|---|
| Names | Meq./100 g. composition solids | | | |
| Glycerine | 65 | 16 | 10 | 7.8 |
| Ethylene glycol | 65 | 830 | 11 | 6.5 |
| Polyethylene glycol of 600 molecular weight | 7 | 55 | 7 | 7.6 |
| Control | | 18,000 | 11 | 5.0 |

EXAMPLE V

A test was conducted to show that the antistat coating composition of the invention also improve the electrical conductivity of a carpet face in which the face yarn contains stainless steel fiber. In carrying out the test, the carpet stock was prepared with a composite wool/stainless steel yarn, the wool containing 0.2% by weight steel yarn. The carpet back face was coated as described hereinbefore using a coating of the control composition and two formulations of the invention. A secondary jute backing was then applied. The face yarn resistance of the three carpets was measured at 15% relative humidity and the following results were obtained.

TABLE 8.—EFFECT OF ANTISTATIC AGENTS ON FACE SURFACE ELECTRICAL RESISTANCE OF CARPET MADE WITH WOOL/STAINLESS STEEL YARN

| Antistatic agents | | Carpet face surface electrical resistance, 15% relative humidity, gigohms/square |
|---|---|---|
| Names | Meq./100 g. composition solids | |
| None | | 3,300 |
| Potassium formate | 24 | 200 |
| Glycerine | 65 | |
| Potassium acetate | 20 | 243 |
| Glycerine | 65 | |

EXAMPLE VI

The following example illustrates the usefulness of substituted alkali metal carboxylates as antistatic agents. The alkali metal (potassium) carboxylates (M) and the polyol (OH), e.g. glycerine, were each added to the polymer in the latex phase at an 8 parts per hundred parts of polymer solids level. The latex formulation was the same as previously described. The polymer composition was supported on glass and the surface electrical resistance (SER) was determined in megohms/square at 12% relative humidity and 72° F.

TABLE 9

| Carboxylate | M, meq./100 g. | OH, meq./100 g. | SER |
|---|---|---|---|
| Monochloroacetate | 15 | 65 | 2,930 |
| Trichloroacetate | 10 | 65 | 4,530 |
| Cyanoacetate | 16 | 65 | 1,090 |
| Glycolate | 17 | 65 | 500 |
| Thioglycolate | 15 | 65 | 610 |
| Thiodiglycolate | 18 | 65 | 2,500 |
| Control | | | 16,700,000 |

EXAMPLE VII

The following example demonstrates the ability of the antistats of the invention to reduce the surface electrical resistance of an elastomeric blend of butadiene-acrylonitrile copolymer with an acrylonitrile-styrene grated butadiene-styrene copolymer. The total acrylonitrile (A), butadiene (B) and styrene (S) contents by weight of this elastomeric blend were as follows: about 27% A, 58% B and 15% S.

The above polymer was compounded as indicated in Table 10, the blends being cured at 320° F. for 10 minutes. The surface electrical resistance (SER) measurements were carried out in a dry box at 72° F. and a relative humidity of 7%. A reduction of the SER by a factor of 7 was realized through the addition of the antistatic agents.

TABLE 10

| | Parts by weight | |
|---|---|---|
| | Control | Invention |
| Elastomer | 100 | 100 |
| Zinc oxide | 5 | 5 |
| Titanium dioxide | 15 | 15 |
| Dibutoxyethoxy ethyl formal | 10 | 10 |
| Sulfur | 10 | 10 |
| 2-benzothiazolyl disulfide | 1.5 | 1.5 |
| Potassium formate, meq./100 g | | 12.7 |
| Glycerine, meq./100 g | | 35 |
| SER, ohms ×10⁷/square | 1,000 | 143 |

EXAMPLE VIII

In order to demonstrate the effectiveness of the antistatic agents in polyalpha-olefin elastomers, an ethylene (66%)-propylene (30%)-ethylidenenorbornene (4%) terpolymer (EPDM) was selected. Ethylene-propylene copolymers and terpolymers generally may have an ethylene content from about 40 to 80% and a propylene content of from 60 to 20%. There are several dienes suitable for the preparation of terpolymers such as 1,4-hexadiene, dicyclopentadiene, ethylidenenorbornene, tetrahydroindene, 1,6-octadiene and many others including conjugated dienes such as isoprene. The diene content may range from about 0 to 15%. In most cases, the diene, when present, does not exceed 10% (wt.) of the total polymer and may preferably be as low as 2%. The polymer compositions were cured at 320° F. for 20 minutes.

The surface electrical resistance (SER) measurement data on Table 11 clearly indicate that the novel antistatic agents drastically reduce the tendency of rubbery polyalphaolefins to build up a static electrical charge.

TABLE 11.—EFFECTIVENESS OF ANTISTATIC AGENTS IN ELASTOMERIC POLYALPHA-OLEFIN

|  | Control | Invention | | |
|---|---|---|---|---|
| Parts by weight: | | | | |
| EPDM | 100 | 100 | 100 | 100 |
| Complexed aluminum silicate | 180 | 180 | 180 | 180 |
| Hydrogenated naphthenic oil | 70 | 70 | 70 | 70 |
| Rutile type TiO₂ | 30 | 30 | 30 | 30 |
| Zinc oxide | 5 | 5 | 5 | 5 |
| Stearic acid | 1 | 1 | 1 | 1 |
| Potassium acetate | | 29 | 15 | 22 |
| Polypropylene glycol, M.W.¹ 400 | | | 31 | 15 |
| Zinc dibutyl dithiocarbamate | 1.5 | 1.5 | 1.5 | 1.5 |
| Mercaptobenzothiazole | 3.0 | 3.0 | 3.0 | 3.0 |
| Dipentylmethylenethiuram tetrasulfide | 0.4 | 0.4 | 0.4 | 0.4 |
| Sulfur | 2.0 | 2.0 | 2.0 | 2.0 |
| Potassium acetate, meq./100 g | | 80 | 40 | 60 |
| Polypropylene glycol, meq./100 g | | | 40 | 20 |
| SER, megohms | 31×10⁶ | 18×10⁴ | 4 | 23 |

¹ M.W.=molecular weight.

EXAMPLE IX

In order to evaluate the effectiveness of the antistatic agents in a plastic polymer, a blend of acrylonitrile-butadiene copolymer with a styrene-acrylonitrile-grafted butadiene-styrene copolymer with a total content of about 23% acrylonitrile, 18% butadiene and 59% styrene was made. These polymer blends are known to the trade as ABS thermoplastics. The antistatic agents potassium formate, glycerine and polypropylene glycol (the latter having an average molecular weight of 3600) were added to the ABS dry thermoplastic at the milliequivalent levels indicated on Table 12. The composition was blended, diced and calendered to a thin sheet. Sheet samples I to V (see below) were then evaluated for their dust attracting power, the accumulation of dust being known to be directly related to the build-up of a static electrical charge on the surface of the sheets. This so-called dust box test was carried out by placing the samples within the test area of an enclosure wherein a motor driven fan circulates dust (i.e. carbon black) throughout. A visual evaluation was made immediately after the 15 minute test run by comparing the samples of the antistatic compositions (III, IV and V) with a standard containing no antistatic agents (I) and a sample II in which polypropylene glycol (average molecular weight 3,600) was the sole antistatic agent.

TABLE 12.—COMPONENTS OF ANTISTATIC AGENTS VS. THERMOPLASTIC PROPERTIES COPOLYMER MIXTURES OF BUTADIENE-, STYRENE- AND ACRYLONITRILE-PLOYMERS (ABS)

|  |  |  | Invention | | |
|---|---|---|---|---|---|
|  | I | II | III | IV | V |
| ABS, parts by weight | 100 | 100 | 100 | 100 | 100 |
| Potassium formate, meq./100 g | | | 18 | 9 | 9 |
| Polypropylene glycol, meq./100 g | | 1.6 | | | .4 |
| Glycerine, meq./100 g | | | 50 | 25 | |
| Dust layer (dust box test) | Heavy | Some | Clear | Slight | Clear |
| Tensile strength, p.s.i. | 5,450 | 4,630 | 5,360 | 5,540 | 5,120 |
| Flex strength, p.s.i. | 8,060 | 6,080 | 7,620 | 7,100 | 7,830 |
| Heat deflection temp., °F | 200 | 200 | 197 | 199 | 203 |
| Flex modulus ×10⁵ | 2.4 | 2.3 | 2.1 | 2.3 | 2.5 |

The results indicate that the antistatic agents of our invention (III, IV and V) not only induced superior antistatic properties to the thermoplastic polymer but they did so without significant loss of physical properties in comparison to the prior art antistat polypropylene glycol alone (II). This surprising superiority was achieved at a greatly reduced concentration level in terms of milliequivalents of antistatic agents per 100 grams of polymer.

Blends of acrylonitrile, -butadiene-styrene polymers which may be employed in producing formulations utilizing the concept of the invention may range in composition by weight of from about 20% to 30% acrylonitrile, about 15% to 65% of butadiene and the balance essentially styrene ranging from about 10% to 65%.

These data show that our coating compositions reduce dramatically the face yarn electrical resistance, even if the face yarn is a conductive type, so that such carpets with the coating compositions of the invention will exhibit outstanding utility where static electrical discharge must be inhibited.

As will be appreciated, the invention is characterized by many embodiments. For example, the invention provides an antistant additive for compounding with polymers, e.g. rubber latex, the additive comprising a polyhydric alcohol selected from the group consisting of polyols and polyether glycols of molecular weight ranging from 62 to about 5000 containing an alkali metal carboxylate derived from carboxylic acids containing 1 to 20 carbon atoms. Advantageously, the ratio of alkali metal carboxylate to the polyhydric alcohol in terms of equivalent weights may range from about 50:1 to 1:100 and, more advantageously, from about 30:1 to 1:30, the alkali metal carboxylate being preferably selected from the group consisting of alkali metal formate, acetate, propionate and butyrate, the potassium salt being particularly preferred. Thus, a liquid of the foregoing materials can be provided which can then be compounded with a polymer, such as rubber latex. The rubber latex may be an aqueous emulsion or dispersion with which the foregoing formulation is then compounded. A surface can then be coated with the compounded composition which is allowed to dry, the dried coating having then conferred to it electrical conductive properties sufficient to inhibit the build-up of electrostatic charges.

As another embodiment, the invention provides a polymer composition containing alkali metal carboxylate for use in forming products capable of inhibiting the build-up of electrostatic charges thereon. The polymer composition in the broad sense may comprise polymer alone or polymer containing extender material. The polymer solids in the composition may be as low as about 4%. Advantageously, it may range from about 6% to 50% by weight of the composition. In a preferred embodiment, the polymer composition, e.g. rubber latex, contains a polyhydric alcohol selected from the group consisting of polyols and polyether glycols of molecular weight ranging from about 92 to 4000, the alkali metal carboxylate being derived from carboxylic acids containing 1 to 20 carbon atoms. Thus, the polymer composition may contain from about 1 to 250 milliequivalents of alkali metal carboxylate (e.g. alkali metal formate, acetate, propionate, butyrate, etc.) per 100 grams of polymer solids and any extender present taken on the dry basis, and from about 0.3 to 450 milliequivalents, preferably about 3 to 300, of polyhydric alcohol per 100 grams of polymer and any extender material present. Advantageously, the alkali metal carboxylate and the polyhydric alcohol in the polymer may be controlled over the ratio of about 50:1 to 1:100 on the equivalent weight basis, the ratio of about 30:1 to 1:30 being particularly preferred.

A formulation of the polymer together with the antistat material may be provided in the form of a liquid for the coating of materials or substrates. Thus, one formulation may comprise a liquid rubber latex dispersion or emulsion with or without extender materials, which is adapted upon drying of providing an electrical conductive deposit capable of inhibiting the build-up of a charge of static electricity. The amounts of alkali metal carboxylate and polyhydric alcohol employed in the liquid polymer formulation are determined in accordance with the polymer composition taken on the dry basis over the ranges mentioned hereinbefore.

Other embodiments include articles of manufacture produced from the improved polymer composition itself, or the article may be a composite comprising a substrate, e.g. fabric, paper, etc., upon which the improved polymer composition is applied to inhibit the build-up of electrostatic charges thereon.

As has been stated herein, the invention is particularly applicable to the manufacture of carpets comprising tufts of fibrous textile material attached to a backing material having adhesively associated therewith the novel polymer composition of the invention, rubber latex modified according to the invention being particularly preferred.

As another embodiment, the invention provides a method for treating an article of manufacture, e.g. a carpet, which in use exhibits a tendency to accumulate a charge of static electricity by applying to the article the improved polymer composition of the invention.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An antistat additive for compounding with polymers whereby to provide polymer compositions capable of inhibiting the build-up of a charge of static electricity on products made from said polymers consisting essentially of a polyhydric alcohol selected from the group consisting of polyols and polyether glycols of molecular weight ranging from about 62 to about 5000 containing an alkali metal carboxylate derived from carboxylic acids containing 1 to 4 carbon.

2. The antistat additive of claim 1, wherein the ratio of the alkali metal carboxylate to the polyhydric alcohol expressed in terms of equivalent weight ranges from 50:1 to 1:100.

3. The antistat additive of claim 2, wherein the alkali metal is selected from the group consisting of lithium, sodium and potassium.

4. The antistat additive of claim 3, wherein the alkali metal is potassium.

5. The antistat additive of claim 2, wherein the ratio of the alkali metal carboxylate to the polyhydric alcohol in terms of equivalent weights is about 30:1 to 1:30.

References Cited

UNITED STATES PATENTS

| | | | |
|---|---|---|---|
| 2,717,842 | 9/1955 | Vitalis | 117—138.8 |
| 3,161,486 | 12/1964 | Rogers et al. | 44—51 |
| 3,437,621 | 4/1969 | Aron | 260—23.7 |

FOREIGN PATENTS 1,064,189  4/1967  Great Britain.

GEORGE F. LESMES, Primary Examiner
W. R. DIXON, JR., Assistant Examiner

U.S. Cl. X.R.
260—DIG. 15, DIG. 16, DIG. 19

PO-1050
(5/69)

UNITED STATES PATENT OFFICE
CERTIFICATE OF CORRECTION

Patent No. 3,745,116    Dated July 10, 1973

Inventor(s) Gordon D. Brindell and Leland E. Dannals

It is certified that error appears in the above-identified patent and that said Letters Patent are hereby corrected as shown below:

Column 1, line 29: cancel "the", and substitute --and--; line 62: correct spelling of "alpha-N-".

Column 6, line 16: cancel "500", and substitute --5000--.

Column 7, line 9: correct spelling of "determined".

Column 10, Table 6, third column heading, line 2: cancel "black", and substitute --back--.

Column 12, line 5: correct spelling of "grafted".

Signed and sealed this 16th day of April 1974.

(SEAL)
Attest:

EDWARD M. FLETCHER, JR.
Attesting Officer

C. MARSHALL DANN
Commissioner of Patents